United States Patent [19]
von Starck et al.

[11] 3,738,777
[45] June 12, 1973

[54] ELECTROMAGNETIC CONVEYING TROUGH WITH COOLING CHANNELS

[75] Inventors: Axel von Starck, Luttringh; Hans-Erwin Gerbig, Remscheid, both of Germany

[73] Assignee: AEG-Elotherm GmbH, Remscheid-Hasten, Germany

[22] Filed: Aug. 6, 1971

[21] Appl. No.: 169,766

[30] Foreign Application Priority Data
Sept. 30, 1970 Germany............... P 20 48 026.6

[52] U.S. Cl..................... 417/50, 310/11, 417/53
[51] Int. Cl....................... H02k 45/00, H02n 4/20
[58] Field of Search............... 310/11; 417/50, 53

[56] References Cited
UNITED STATES PATENTS

| | | | |
|---|---|---|---|
| 3,088,411 | 5/1963 | Schmidt | 417/50 |
| 3,288,069 | 11/1966 | Michaux | 417/50 |
| 3,442,217 | 5/1969 | Hanlin | 417/50 |
| 3,453,460 | 7/1969 | Butler | 417/50 |
| 3,514,646 | 5/1970 | Ito | 310/11 |
| 3,515,898 | 6/1970 | von Starck | 310/11 |
| 3,553,502 | 1/1971 | Kasahara | 310/11 |
| 3,621,310 | 11/1971 | Takeuchi | 310/11 |

FOREIGN PATENTS OR APPLICATIONS

| | | | |
|---|---|---|---|
| 1,203,868 | 11/1965 | Germany | 310/11 |
| 26,664 | 6/1966 | Japan | 310/11 |

*Primary Examiner*—William L. Freeh
*Assistant Examiner*—John T. Winburn
*Attorney*—Cushman, Darby & Cushman

[57] ABSTRACT

An electromagnetic conveyor of the type having an obliquely ascending trough, a travelling field inductor mounted beneath the trough with a core and a polyphase winding comprised of solid, bare conductors carried by the core and a housing for receiving the heads of the windings which forms a cooling channel through which a liquid coolant, such as water, can circulate. The housing preferably also forms a return channel which communicates with the cooling channel at the upper end of the trough and the conductor portions in heat conducting relationship with the circulating coolant are preferably coated with electrical insulation to prevent electro-chemical dissociation of the coolant. The cooling channel may be bounded by an electrically insulating compound which can be poured into the housing after a consumable core is first placed in the housing. After the compound has set, the core can be removed, for example by melting. The invention relates to an electromagnetic conveying trough comprising an obliquely ascending trough and, below the trough, a travelling field inductor having a laminated slotted sheet iron core carrying a polyphase winding. The bottom end of the conveying trough is usually connected to a melting or holding furnace containing a molten metal charge from which the electromagnetic field travelling toward the upper end of the trough conveys liquid metal to the top of the trough. The winding heads of the inductor windings are usually contained in winding head housings located on each side of the laminated core.

11 Claims, 3 Drawing Figures

AN ELECTROMAGNETIC CONVEYING TROUGH WITH COOLING CHANNELS

An arrangement of such a kind has already been described for instance in German Pat. Specification No. 1,286,264. These arrangements are used with advantage for instance in automated foundries where they serve to deliver metered volumes of metal. Two arrangements for metering metal, for instance for casting exactly proportioned quantities of metal, are described in German Pat. specifications Nos. 1,286,701 and 1,291,061.

In such conveying troughs the windings of the travelling field inductor are usually bar windings, comprising hollow bar conductors, through which a cooling fluid is passed for removing the Joulean heat as well as the heat that is transferred by the liquid metal from the trough to the windings. The high pressure loss experienced by the flowing coolant in the hollow bars usually in practice necessitates dividing the cooling system into several cooling circuits with the requisite number of connections, supply and return pipes, flow control devices and so forth. This considerable expenditure for cooling circuits takes up a lot of space which, particularly in the case of conveying troughs that are not very large, is very difficult to provide in some applications. The design complication that is involved in providing for cooling also undesirably raises the number of sources where troubles and faults may arise.

It is therefore the object of the present invention to provide an electromagnetic conveying trough in which the dissipation of heat from the windings of the travelling field inductor is accomplished in a simple and inexpensive way.

In a conveying trough according to this invention the winding consists of solid, bare copper conductors and the housings containing the winding heads form coolant channels through which a liquid coolant is circulated. In a preferred arrangement the liquid coolant leaves the coolant channel substantially at its upper end.

In an advantageous embodiment of the invention the conductors forming the windings which has the conventional form of a bar winding are provided with an electrically insulating coating, at least where their surfaces are in heat conduction relationship with the coolant, in order to avoid electro-chemical dissociation of the coolant, for instance electrolysis of the cooling water. This electrically insulating coating may be conveniently applied by sintering in a fluidised bed.

For conveniently sealing the cooling channel as well as to prevent electrolytic effects from occuring when the insulating coating is damaged, yet another useful optional feature of the invention consists in making the walls of the cooling channels at least partly of electrically insulating material. More particularly an electrically insulating wall portion of a cooling channel may be formed by an electrically insulating composition which in the region of the winding heads directly adjoining the ends of the slots in the laminated core fills the spaces between the conductors of the bar winding as well as those between these conductors and the neighbouring parts of the winding head housing wall. According to the invention this electrically insulating wall portion may be produced by pouring a self-setting synthetic plastic compound into appropriate spatial regions of the coil head housing. Particularly when the entire wall of the cooling channel is to consist of an electrically insulating material the cooling channel may be produced by placing a consumable core around the coil ends that are to be cooled, by pouring the self-setting plastics into the cavity between this consumable core and the wall of the coil end housing and by finally melting and thus removing the consumable core.

For supervising the cooling effect another useful aspect of the invention consist in locating thermoelements in the slots of the laminated core.

The invention will be hereinafter more particularly described with reference to the drawings which illustrate embodiments of the invention.

Figure 1:
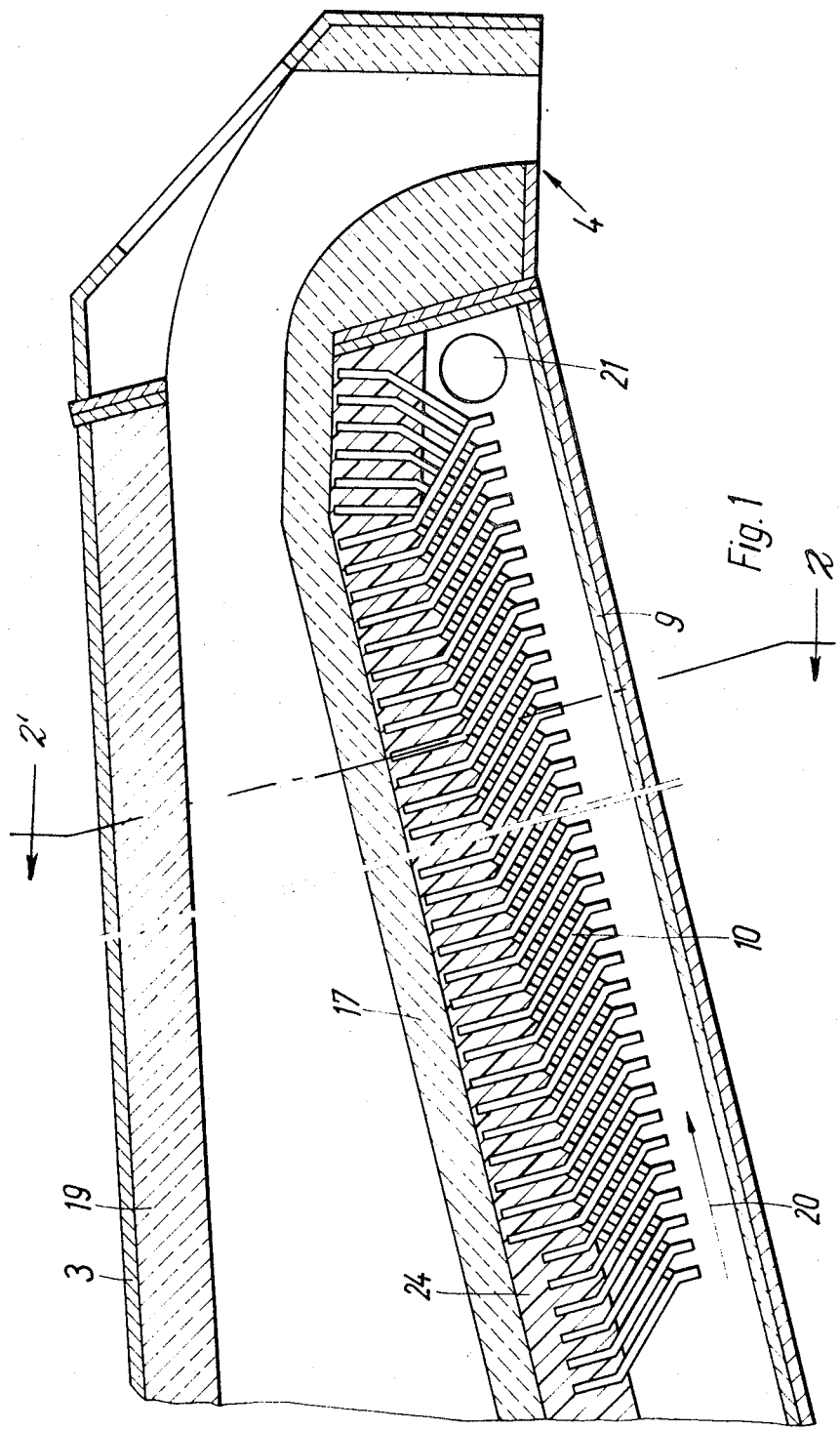
FIG. 1 shows a first embodiment of an electromagnetic conveying trough in longitudinal section.
Figure 2:
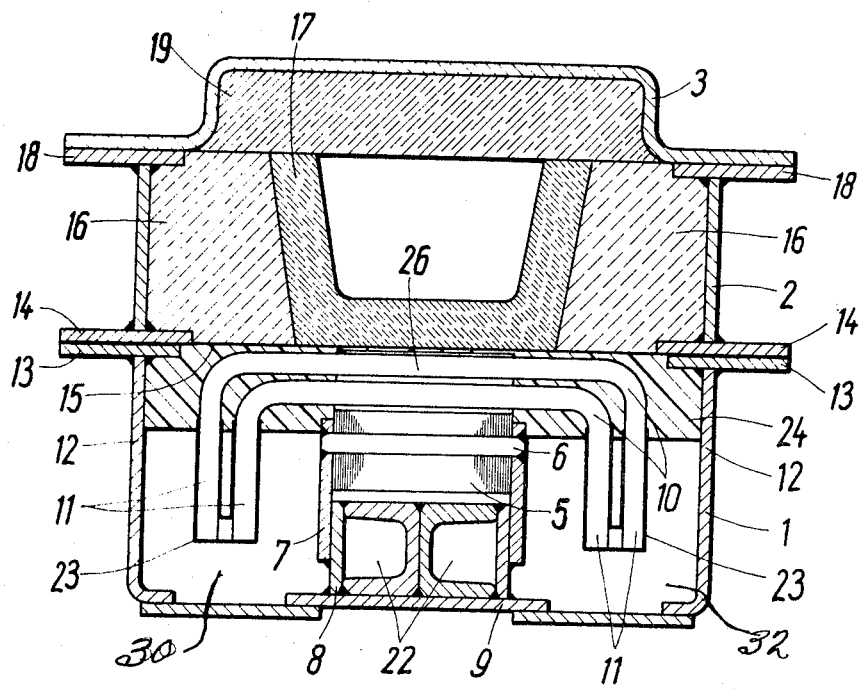
FIG. 2 shows a cross section of the same embodiment along the lines 2—2'.

The conveying trough structurally consists of a casing comprising a bottom part 1 (FIG. 2) an upper part 2 and a cover 3 for the trough. At its upper end (FIG. 1) the trough forms a pouring spout 4, whereas its lower, left-hand end in FIG. 1 merges into a melting or holding furnace (not shown in the drawing).

The bottom part of the casing contains a travelling field inductor which has a laminated core 5 of slotted laminar dynamo sheets held together by tiebolts 6 between sideplates 7, and which is mounted on a base 8 secured to the baseplate 9 of the bottom part 1 of the casing. Inserted as an inductor winding into the slots of the laminated core 5 is a two-layer three-phase bar winding 10. The winding head 11 of this winding is contained inside the bottom part 1 of the casing on each side of the laminated iron core 5. The upper ends of the sides 12 of the bottom part 1 of the casing are formed with flanges 13 bolted to cooperating flanges 14 of the upper part 2 of the casing. Clamped between these two flanges 13 and 14 is a coverplate 15 of non-magnetic steel forming the top of the bottom part of the casing. The upper part 2 of the casing contains the refractory body 16 of the trough constructed from brickwork, on each side and a refractory lining 17 firmly rammed into place to form the trough proper. The upper part 2 of the trough is connected by flanges 18 to the trough coverplate 3 which on its underside is likewise provided with a heat insulating lining 19.

For cooling the inductor windings 10 the winding head housings form cooling channels 30 and 32 through which water is circulated in the direction of the arrow 20 (in FIG. 1) to serve as a coolant for removing heat from the inductor through the winding heads with which it is in heat conduction relationship. The water leaves the upper end of the cooling channel through a lateral opening 21 and enters a return channel 22 inside the base 8, the return channel conducting the cooling water back to the lower end of the trough.

The surfaces of the inductor winding 10 which are in heat conduction relationship with the water or other coolant are provided with an electrically insulating coating 23 that has been applied preferably by fluid bed sintering. In order to limit the internal cross section of the coolant channels to the desired dimensions and, also to prevent cooling water from penetrating into the slots in the laminated core 5, the spaces between the conductors of the bar winding 10 as well as between these conductors and the adjacent parts of the wall of the winding head housings are filled adjacent the slot ends with an electrically insulating compound 24. This electrically insulating compound 24 preferably consists of a self-setting synthetic plastic which, during production of the inductor, is poured through openings in the bedplate 9 into the bottom part 1 of the casing — which for this purpose is placed upside down so that the slots are at the bottom.

Figure 3:
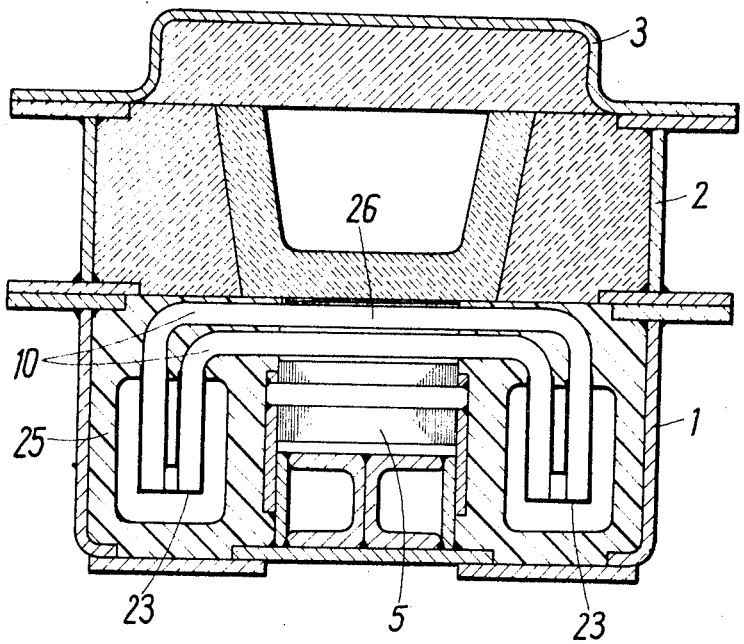
FIG. 3 shows a cross section of a further embodiment of the invention.

In a different embodiment of the proposed conveying through of which FIG. 3 is a cross section the entire wall of the cooling channel consists of an electrically insulating composition. This can be done by embedding the winding heads that are to be cooled in a consumable core made of, for example, beeswax which has the shape of the subsequent cooling channel.

The remaining cavity in the bottom part of the casing 1 is then filled by pouring in a self-setting synthetic plastics compound 25. When this has set the consumable core is melted out. This technique permits the cooling channel to be formed in a simple way.

For monitoring the cooling effect the embodiments that have been described may be further improved by locating conventional thermo-elements 26 in one or more of the slots of the laminar iron core 5.

What is claimed is:

1. In an electromagnetic trough having an obliquely ascending trough, a travelling field inductor mounted below the trough with a core and a winding carried by said core having winding heads and a housing at each side of the core into which reach the winding heads of said winding, the improvement wherein said winding is comprised of solid, bare conductors, wherein electrically insulating material fills, at each side of the core in the region of the winding heads adjoining slot ends of the core, at least the space between the conductors of the winding and the spaces between the conductors and the adjacent parts of each of the housings into which the winding heads of said winding reach and wherein at each housing into which said winding heads are reaching a remaining inner free surface of the housing and free surfaces of the conductors of the winding head bound a cooling channel through which a liquid coolant can circulate.

2. In a conveyor as in claim 1 further including at least a single thermo-element located inside the slots of said winding for monitoring the temperature.

3. In a conveyor as in claim 1 wherein said housing forms a return channel communicating with said cooling channel at the upper end of said trough.

4. A method for cooling an electromagnetic conveying trough having an obliquely ascending trough, a traveling field inductor mounted below the trough with a core and a winding carried by said core with winding heads and comprised of solid bare conductors, a housing at each side of said core into which said winding heads extend and electrically insulating material filling, at each side of the core in the region of the winding heads adjoining slot ends of the core, at least the space between the conductors of the winding and the spaces between the conductors and the adjacent parts of each of the housings into which the winding heads of said winding reach comprising circulating a liquid coolant through the cooling channel formed by said housing and bounded by the remaining inner free surface of the housing and free surfaces of the conductors of said winding heads.

5. A method as in claim 4 wherein said housing forms a return channel communicating with said cooling channel at the upper end of said trough and said step of circulating includes the step of circulating said liquid coolant up said cooling channel into said return channel and down said return channel.

6. In a method for construction an electromagnetic conveying trough having an obliquely ascending trough, a traveling field inductor mounted below the trough with a core and a winding carried by said core with winding head a housing at each side of said core into which said winding head extends and electrically insulating material filling, at each side of the core in the region of the winding heads adjoining slot ends of the core, at least the space between the conductors of the winding and the spaces between the conductors and the adjacent parts of each of the housings into which the winding heads of said winding reach, the improvement comprising forming said winding of solid, bare conductors and forming a cooling channel in said housing through which a liquid coolant can circulate and bounded by the remaining inner free surface of the housing and free surfaces of the conductors of said winding heads.

7. In a method as in claim 6 including the step of pouring a self-setting synthetic plastic compound into said housing to form said insulating material.

8. In a method as in claim 6 including the steps of embedding a consumable core in said housing before pouring and removing said core after said compound has set to form said insulating material.

9. In a method as in claim 6 including the further step of forming a return channel communicating with said cooling channel at the upper end of said trough.

10. In a method as in claim 6, the further step of applying an electrically insulating coating to at least the portions of said conductors that are in heat conductive relationship with the coolant in order to prevent electrochemical dissociation of said coolant.

11. In a method as in claim 10 wherein said step of applying includes the step of sintering in a fluidised bed to apply said coating.

* * * * *